United States Patent
Hiraya et al.

(10) Patent No.: US 7,234,437 B2
(45) Date of Patent: Jun. 26, 2007

(54) DIRECT-INJECTION INTERNAL COMBUSTION ENGINE AND COMBUSTION METHOD THEREFOR

(75) Inventors: Koji Hiraya, Kanagawa (JP); Toshiya Kono, Kanagawa (JP); Masahiro Fukuzumi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 11/378,045

(22) Filed: Mar. 17, 2006

(65) Prior Publication Data

US 2006/0219211 A1 Oct. 5, 2006

(30) Foreign Application Priority Data

Mar. 18, 2005 (JP) ............................. 2005-079384

(51) Int. Cl.
*F02F 3/26* (2006.01)
*F02B 17/00* (2006.01)

(52) U.S. Cl. ...................... 123/276; 123/295; 123/298; 123/305

(58) Field of Classification Search ................ 123/295, 123/298, 305, 276
See application file for complete search history.

(56) References Cited

U.S. PATENT DOCUMENTS 6,736,107 B1 * 5/2004 Grajkowski ................ 123/305
2001/0003281 A1 * 6/2001 Mori et al. ................. 123/305
2004/0050359 A1 * 3/2004 Imoehl ....................... 123/295
2005/0061294 A1 * 3/2005 Bridge ....................... 123/305
2006/0207551 A1 * 9/2006 Ikoma ........................ 123/305

FOREIGN PATENT DOCUMENTS

| EP | 1098080 A1 | 5/2001 |
| EP | 1369561 A2 | 12/2003 |
| EP | 1433935 A2 | 6/2004 |
| EP | 1471227 A2 | 10/2004 |
| EP | 1473455 A2 | 11/2004 |

OTHER PUBLICATIONS

European Patent Search No. 06251425.2-2311 dated Jul. 14, 2006.

* cited by examiner

*Primary Examiner*—Erick Solis
(74) *Attorney, Agent, or Firm*—Rader, Fishman & Grauer PLLC

(57) ABSTRACT

A direct-injection internal combustion engine and a combustion method therefore in which fuel injection timing of a fuel injection valve is so configured that (a) the fuel inverted from a cavity in a crown portion of a piston reaches proximity to the discharge electrode portion of a spark plug later than the time of ignition or (b) fuel injection by the fuel injection valve is completed at approximately the same time of ignition. There is no risk of rich combustion at the discharge electrode portion due to the mixed fuel-air mass having a high fuel density, and consequently problems such as wear on the spark plug or smoke generation can be avoided.

13 Claims, 7 Drawing Sheets

DIRECT-INJECTION INTERNAL COMBUSTION ENGINE AND COMBUSTION METHOD THEREFOR

RELATED APPLICATION

The disclosure of Japanese Patent Application No. 2005-079384, filed Mar. 18, 2005, including the specification, claims and drawings, is incorporated herein by reference in its entirety.

FIELD

Described herein is a spark-ignition, direct-injection, internal combustion engine and an improved combustion method therefor.

BACKGROUND

In many spark-ignition, direct-injection, and internal combustion engines, a fuel injection valve and a spark plug are positioned adjacent to each other around the center of each combustion chamber in order to provide an optimum fuel-air mixture or combustivity. With such an arrangement, the density of the fuel is relatively great at the discharge electrodes of the spark plug, thereby causing problems such as shortening the life of the spark plugs due to smoldering of their electrodes, or the generation of smoke due to ignition failure.

SUMMARY

The present direct-injection internal combustion engine includes a fuel injection valve that injects fuel toward a cavity provided at the crown surface of a piston. A spark plug is disposed so that its discharge electrode portion is in the proximal area of the fuel from the fuel injection valve. An operating condition sensor detects the engine operating condition; and a control device regulates the amount of fuel injected by the fuel injection valve, the injection timing and the ignition timing of the spark plug based on the detected operating condition. The control device is configured so that the timing of fuel injection is such that the fuel inverted by the piston cavity reaches proximity with the discharge electrode portion later than the time of ignition.

BRIEF DESCRIPTION OF THE DRAWINGS

Other features and advantages of the present engine and method will be apparent from the ensuing description, taken in conjunction with the accompanying drawings, in which.

DETAILED DESCRIPTION OF THE ILLUSTRATED EMBODIMENTS

Figure 1:
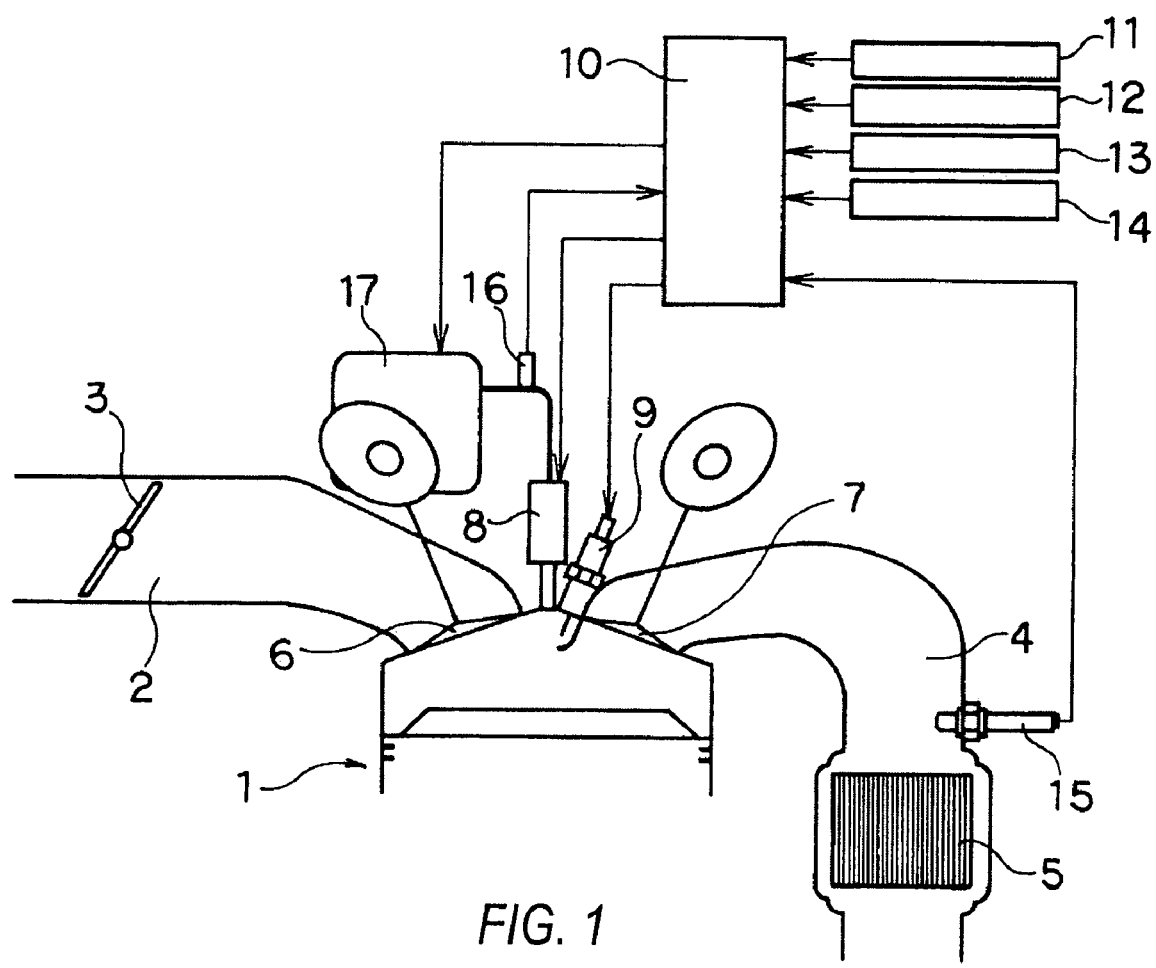
FIG. 1 is a partial schematic view of a direct-injection internal combustion engine.

Throughout the drawings, common elements are identified by the same reference characters. FIG. 1 schematically shows a partial structure of an internal combustion engine. Shown in the figure, is the overall internal combustion engine 1, an inlet path 2, a throttle valve 3, an exhaust path 4, a catalytic converter 5, an inlet valve 6, an exhaust valve 7, a fuel injection valve 8, and a spark plug 9. Also shown in FIG. 1 are a control unit 10, an air flow sensor 11, an accelerator aperture sensor 12, a crank angle sensor 13, a coolant temperature sensor 14, and an exhaust oxygen sensor 15. A fuel pump 17 feeds fuel under pressure to the fuel injection valve 8 by cam driving and a pressure sensor 16 detects the fuel pressure.

The control unit 10 preferably comprises a microcomputer that includes a CPU and peripheral devices. The control unit 10 determines the operating conditions of the internal combustion engine based on input from each of sensors 11 to 16, which are detection devices for the operating conditions, and controls operation of the fuel pump 15, fuel injection nozzle 18 and spark plug 19 so that the injection timing for the fuel, the amount of fuel injected and the ignition timing match predetermined target values for each.

Figure 2A:
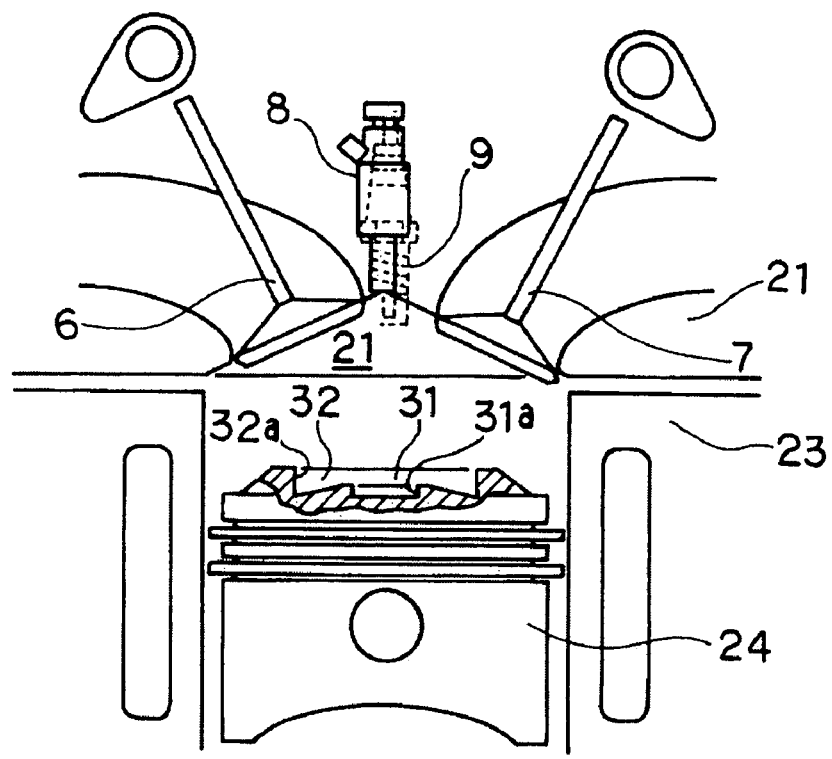
FIG. 2A is a schematic front elevational view in section, showing details of a combustion chamber structure of the present internal combustion engine according to a first embodiment thereof.
Figure 2B:
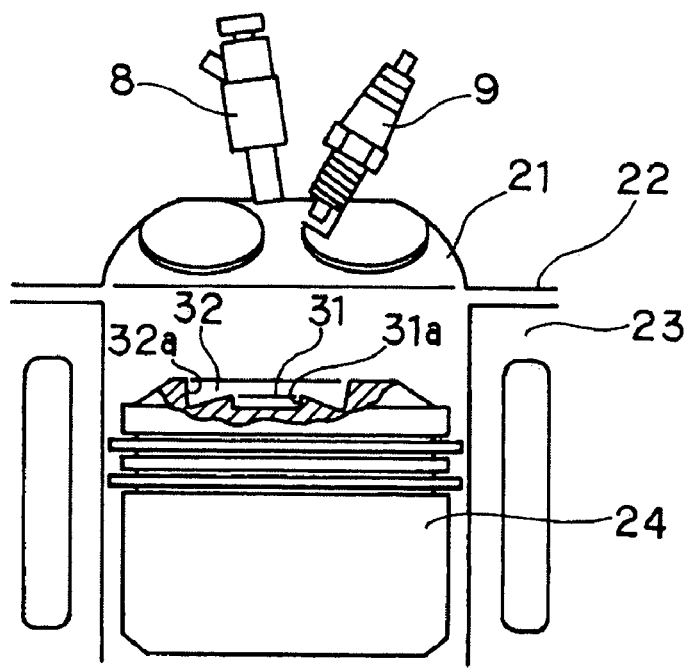
FIG. 2B is a schematic side elevational view in section, showing additional details of the combustion chamber structure of FIG. 2A.

FIGS. 2A and 2B show in greater detail the structure of the periphery of a combustion chamber of the internal combustion engine. Represented in these figures are a combustion chamber 21, a cylinder head 22, a cylinder block 23 and a piston 24.

This internal combustion engine is a four-valve type, each combustion chamber thereof having two each of inlet valves 6 and exhaust valves 7, and the fuel injection valve 8 and spark plug 9 are provided in the proximity of the center of the combustion chamber surrounded by the above-mentioned four valves 6 and 7. The fuel injection valve 8 is so disposed that the center of the fuel is approximately parallel to the cylinder axis. A circular cavity 31 is formed on the crown surface of the piston 24 so that it faces the fuel injection valve 8. An annular secondary cavity 32 is formed about the circumference of the cavity 31. The lateral walls 31a and 32a of each cavity form an approximately orthogonal cylindrical shape parallel to the cylinder axis; nonetheless, the lateral walls 31a and 32a may be of a tapered lateral wall shape in which they are slanted toward the cylinder sidewall.

Figure 3:
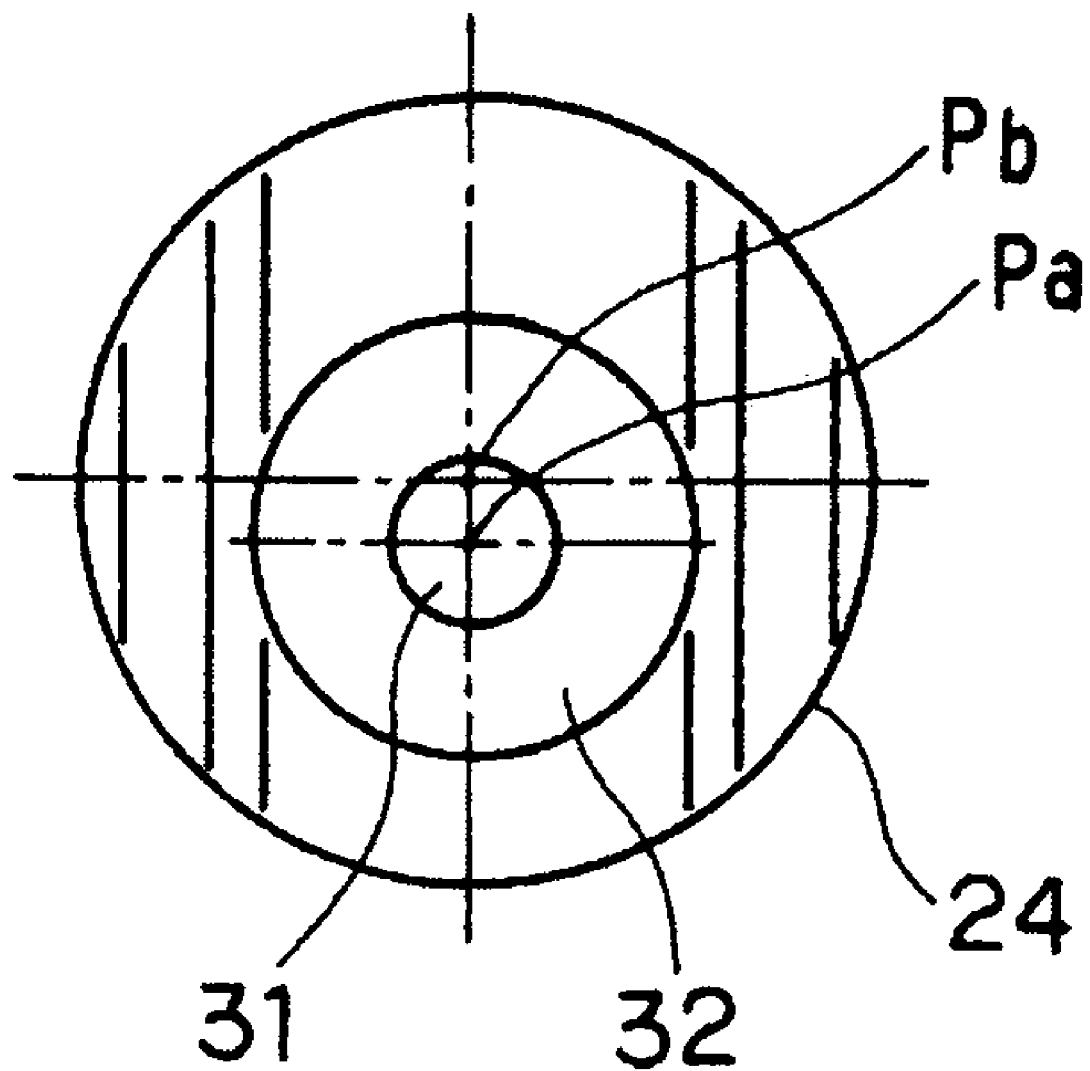
FIG. 3 is a top plan view of a piston crown surface according to the first embodiment.

As shown in FIG. 3, the centers Pa of the cavities 31 and 32 are located slightly offset relative to the cylinder central axis Pb, and due to this configuration, the fuel from the fuel injection valve 8 collides with the approximate center portion of the cavity 31. At the same time, the spark plug 9 is configured so that it serves as a spray guide, in which its discharge electrodes 9a are positioned inside the cavity area formed by the cavity lateral wall 31a, viewed from the direction of the cylinder axis, and at the same time, it is adjacent to the fuel from the fuel injection valve 8.

Figure 4A:
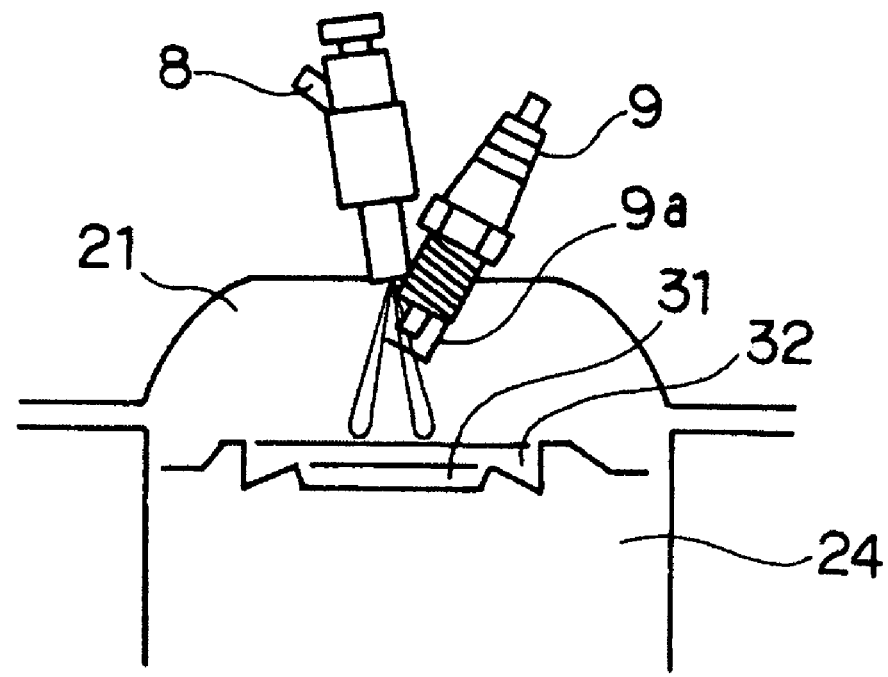
FIGS. 4A and 4B are views similar to FIG. 2B, showing formation of fuel according to the first embodiment.
Figure 4B:
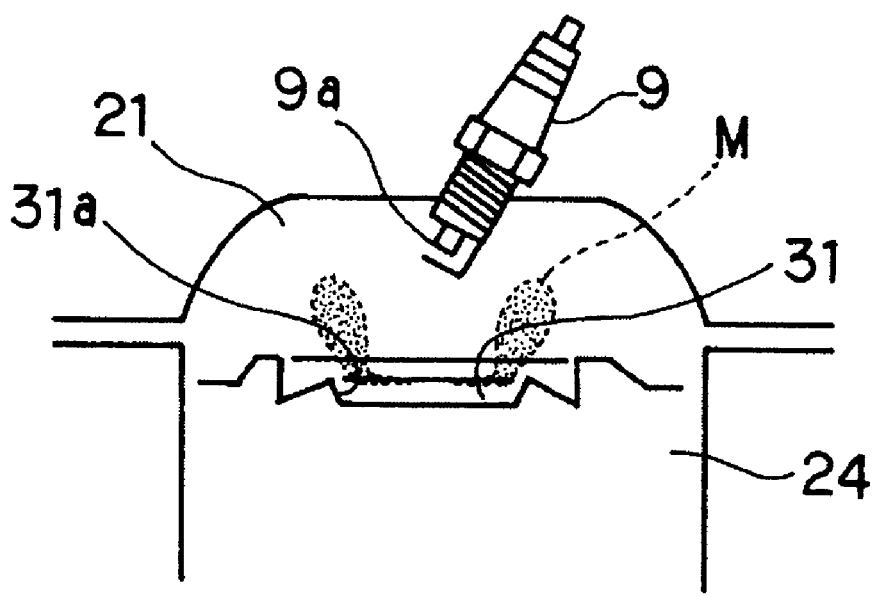

FIGS. 4A and 4B show the condition of the fuel when the direct-injection internal combustion engine having the above-mentioned structure is driven using the stratified combustion method, FIG. 4A showing the condition during the first half of the period of injection, and FIG. 4B showing the condition during the second half of the period of injection. Fuel injection is carried out in stratified combustion as the piston is rising during the second half of the compression process. At that time, the fuel is injected from the fuel injection valve 8, as shown in FIG. 4A, toward the approximate center of the internal cavity 31 so that the entire amount of the fuel is directed toward the cavity 31. This injected fuel strikes the bottom surface of the cavity 31, is diffused in the peripheral direction, strikes, and is guided by, the lateral wall 31a of the cavity, and then moves toward the upper side of the combustion chamber. During this process, the injected fuel is mixed with atmospheric air, and therefore the fuel traveling upwardly forms an approximately annular mixed fuel-air mass M that conforms to the circumferential shape of the cavity 31 (see FIG. 4B). At this time, according to the first embodiment, the fuel injection valve 8 is so disposed that the center of the fuel becomes parallel to the cylinder axis and coincides with the center of the cavity 31. Therefore, the formation of the annular mixed fuel-air mass by the cavity 31 can be evenly carried out in a stable manner regardless of fuel injection timing or the position of the piston, and consequently, is effective in avoiding unburned HC or smoke generation.

The annular mixed fuel-air mass diffuses in the inward and outward radial directions, as the piston 24 rises, and reaches the discharge electrode portion 9a of the spark plug. In the present engine, ignition is carried out before the stratified mixed fuel-air mass having high fuel density reaches the discharge electrode portion 9a. In other words, when the ignition timing is used as an index, the fuel injection is carried out with timing such that the fuel-rich mixture formed after fuel injection has not yet reached the discharge electrode portion 9a of the spark plug at the time of ignition. This avoids rich combustion at the periphery of the discharge electrode portion 9a of the spark plug, thereby preventing the spark plug from generating smoldering or smoke.

According to the first embodiment, the discharge electrode portion 9a of the spark plug is disposed as closely as possible to the fuel injection valve 8 in the interior of the cavity 31. In other words, it is disposed to be at the approximate center of the annular mixed fuel-air mass, and therefore it can prolong the period during which the mixed fuel-air mass diffuses radially inwardly of the combustion chamber to reaches the discharge electrode portion 9a, or it can extend the distance between the mixed fuel-air mass and discharge electrode portion 9a. By doing so, the fuel density of the mixed fuel-air mass around the discharge electrode portion 9a at the time of ignition can be reduced and the degree of flexibility for fuel injection timing can be increased.

In addition, disposing the discharge electrode portion 9a of the spark plug as described above reduces the radius of the mixed fuel-air mass by some portion, and therefore stratified combustion with improved fuel consumption rate can be carried out during idling or under low-load operating conditions. However, when the diameter of the cavity 31 is reduced in order to form a mixed fuel-air mass having a small diameter, the injected fuel overflows around the circumference under mid- to high-load operating conditions, and may interfere with stratification of the mixed air. In anticipation of this condition, the present embodiment includes a second cavity 32 surrounding the cavity 31, and therefore fuel overflowing from the primary cavity 31 can be trapped by the secondary cavity 32 and diffusion of the fuel-air mixture can be prevented. Consequently, stratified combustion can be carried out over a wider operating range. Depending on the operating conditions, the mixed fuel-air mass formed by the internal cavity 31 becomes too rich and smoke and unburned HC may be generated. To counter this, the cavity lateral wall portion 31a is tapered so that it increases in diameter in the direction of the combustion chamber and therefore compensates for the tendency of the fuel to be concentrated at the center portion of the combustion chamber. Therefore, it is possible to make adjustments so that a mixed fuel-air mass having an appropriate fuel density can be formed. Such an adjustment of the fuel density by using the angle of the gradient of the cavity external wall is also effective when applied to the external secondary cavity 32. In other words, the size and density of the stratified mixed fuel-air mass under mid- to high-load operating can be adjusted by means of the above-mentioned angle of the gradient.

The ignition timing described above, in which the mixed fuel-air mass formed by the cavities 31 and 32 reaches the discharge electrode portion 9a of the spark plug can be, according to experimentation, configured to be near to the completion time of the fuel injection. In particular, if it occurs prior to completion of the injection, the fuel, immediately after the injection but before diffusing, is present in proximity to the discharge electrode portion 9a, and therefore a preferable ignition and combustion can be expected.

Figure 5A:
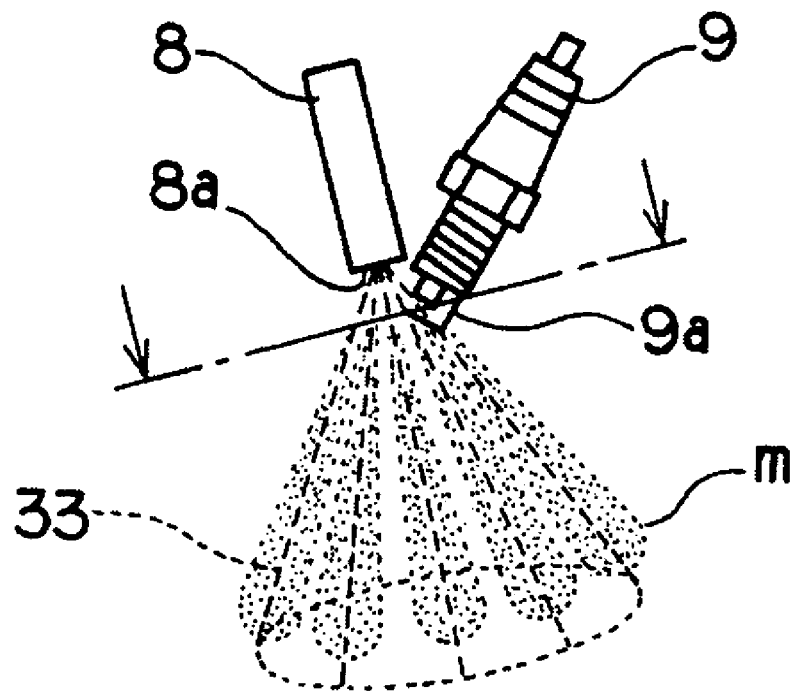
FIG. 5A is a schematic perspective view showing an example of fuel formation.
Figure 5B:
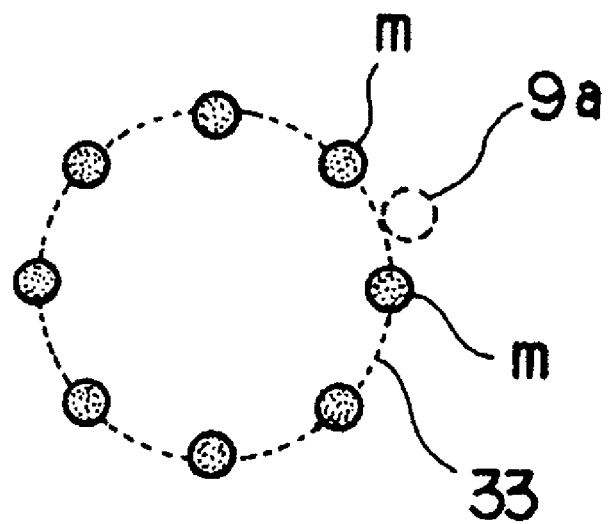
FIG. 5B is a schematic plan view of the fuel example of FIG. 5A.

FIG. 5A shows relative dispositions of the fuel injection valve 8 and spark plug appropriate for carrying out ignition with the above-described timing. FIG. 5A also shows a perspective view of an example of the fuel formation. FIG. 5B is a plan view in the axial direction around the discharge electrode portion 9a of the spark plug. In this case, as shown in FIG. 5A, the fuel injection valve 8 is a multiple-aperture nozzle in which the fuel is injected in a radial pattern along a virtual circular cone surface 33 with the nozzle portion 8a as the apex. As shown in FIG. 5B, the discharge electrode portion 9a of the spark plug is disposed at the center between two adjacent lobes of fuel from among the multiple (in this case, eight) lobes of fuel injected by the multiple-aperture nozzle. The fuel does not directly come in contact with the discharge electrode portion 9a of the spark plug, and therefore, even if ignition is carried out during fuel injection, so-called fogging of the spark plug does not occur, and in addition, ignition can be carried out in the mixed atmosphere of high fuel density close to the fuel, and therefore optimal ignition and combustion can be secured. In addition, the multiple-aperture nozzle can form a fuel formation having a less tapered or modified shape even in a high-pressure cylinder during the latter half of the compression process, and consequently a more stable ignition performance can be obtained.

Figure 6:
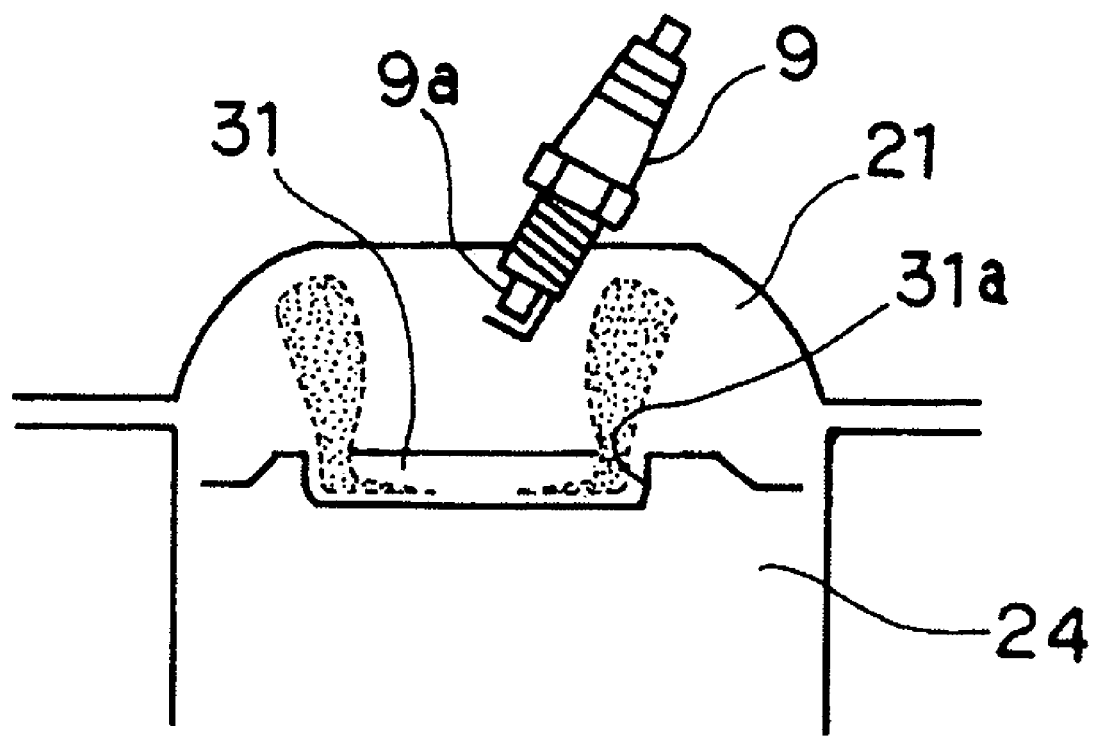
FIG. 6 is a schematic view similar to FIGS. 4A and 4B, showing a second embodiment of the present internal combustion engine.
Figure 7:
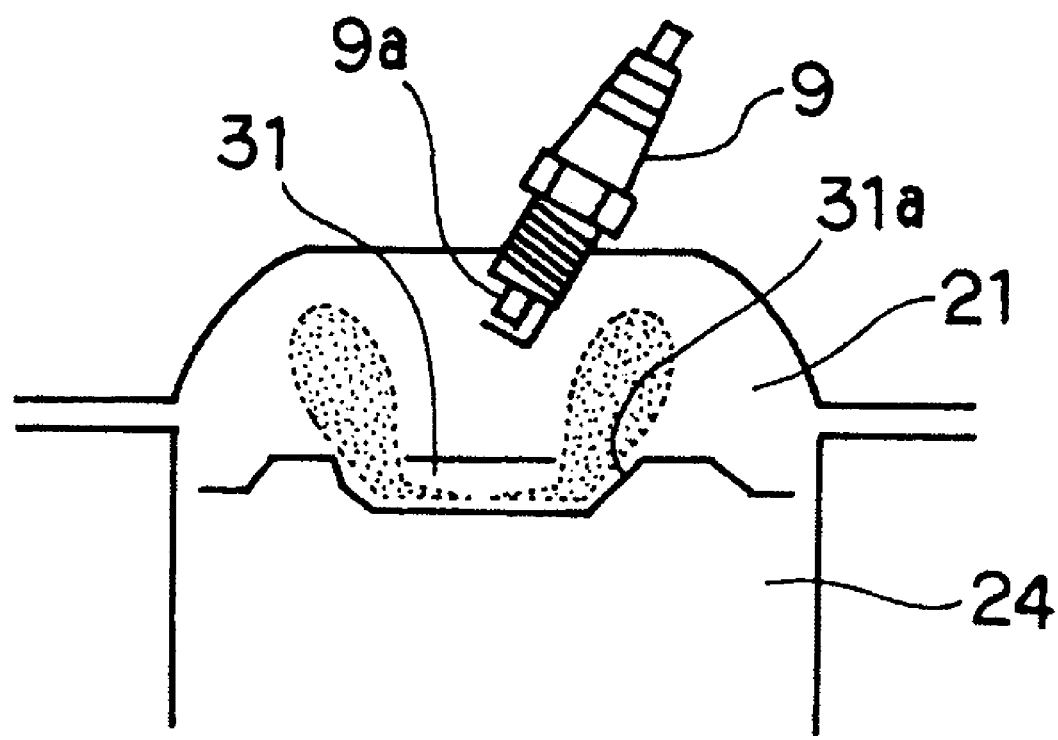
FIG. 7 is a schematic view similar to FIG. 6, showing a third embodiment of the present internal combustion engine.

FIGS. 6 and 7 show second and third embodiments, respectively, of the present internal combustion engine. The first embodiment described above is provided with a double cavity structure in which a second cavity 32 surrounds a primary cavity 31 having a relatively small diameter. The present engine is not so limited to may have a single cavity structure as shown in FIGS. 6 and 7. FIG. 6 shows a structure in which the lateral wall portion 31a of the cavity 31 is formed in the shape of an orthogonal cylinder surface parallel to the cylinder axis, and FIG. 7 shows one in which the lateral wall 31a is formed with a tapered shape by forming an angle so that its diameter increases in the direction of the combustion chamber.

According to the second embodiment having a cavity formed with an orthogonal cylindrical lateral wall portion 31a as shown in FIG. 6, the deflected direction of the fuel in the cavity 31 is approximately parallel to the cylinder axis and therefore, a mixed fuel-air mass can be formed with a stable size regardless of the position of the piston. In contrast, according to the third embodiment having a cavity formed with a tapered lateral wall portion 31a as shown in FIG. 7, the direction of diffusion of the mixed fuel-air mass deflected by the surface of the cavity 31, and the time in which the mass reaches the discharge electrode portion 9a of the spark plug can be adjusted to correspond to the fuel injection timing. By taking advantage of these properties, a stratified combustion can be carried out over a wide operating range with a single cavity structure, and at the same time, the effect of the present engine described above can be realized.

While the present direct-injection internal combustion engine has been described in connection with certain specific embodiments thereof, this is by way of illustration and not of limitation, and the appended claims should be construed as broadly as the prior art will permit.

What is claimed is:

1. A direct-injection internal combustion engine comprising:
    a cylinder;
    a fuel injection valve for injecting fuel toward a cavity formed in a crown surface of a piston received in the cylinder such that a mixed fuel-air mass is formed by the fuel injected from the fuel injection valve that is inverted after striking the cavity and mixed with air in the combustion chamber;
    a spark plug having a discharge electrode portion disposed in a proximal area of the fuel injected by the fuel injection valve, wherein the fuel that is present in a proximity of the discharge electrode portion is ignited immediately after fuel injection, but before the injected fuel reaches the cavity;
    an operating condition sensor for detecting an engine operating condition; and
    a control device for controlling the amount of fuel injected by the fuel injection valve, fuel injection timing, and ignition timing of the spark plug based on the detected operating condition;
    wherein the control device is configured to control the ignition timing so that the ignition is carried out after the mixed fuel-air mass is formed, but before the mixed fuel-air mass reaches the proximity of the discharge electrode portion.

2. A direct-injection internal combustion engine according to claim 1, wherein the cavity is so structured that the discharge electrode portion of the spark plug is positioned inwardly of the cavity area formed by a lateral wall of the cavity when viewed in the axial direction of the cylinder.

3. A direct-injection internal combustion engine according to claim 2, wherein the lateral wall of the cavity is approximately parallel to the cylinder axis.

4. A direct-injection internal combustion engine according to claim 2, wherein the lateral wall of the cavity is slanted toward a sidewall of the cylinder from a bottom side of the cavity.

5. A direct-injection internal combustion engine according to claim 1, wherein the fuel injection valve is so disposed that the center of the fuel injected thereby is approximately parallel to the cylinder axis.

6. A direct-injection internal combustion engine according to claim 1, wherein the fuel injection valve is so disposed that it approximately coincides with the center of the cavity when viewed in the direction of the cylinder axis.

7. A direct-injection internal combustion engine according to claim 1, wherein an annular secondary cavity is provided around the circumference of the cavity formed in the crown surface of the piston.

8. A direct-injection internal combustion engine according to claim 7, wherein a lateral wall of the secondary cavity is approximately parallel to the cylinder axis.

9. A direct-injection internal combustion engine according to claim 1, wherein the ignition timing is configured to effect ignition within the period of fuel injection.

10. A direct-injection internal combustion engine according to claim 1, wherein the fuel injection valve includes a multiple-aperture nozzle portion for injecting fuel in a radial pattern along a virtual circular cone with the nozzle portion as the apex.

11. A direct-injection internal combustion engine according to claim 10, wherein the discharge electrode of the spark plug is disposed between two adjacent lobes of fuel from among the multiple lobes of fuel injected from the multiple-aperture nozzle portion.

12. A combustion method for a direct-injection internal combustion engine comprising:
    injecting fuel that is supplied from a fuel injection valve to a cavity provided at a crown surface of a piston;
    deflecting the fuel entering the cavity upwardly along a cavity lateral wall towards a discharge electrode portion;
    forming a mixed fuel-air mass by mixing the fuel deflected from the cavity and air in the combustion chamber; and
    carrying out ignition of the fuel which is present in proximity to the discharge electrode portion immediately after fuel injection but before the fuel reaches the cavity;
    wherein the ignition timing is carried out before the mixed fuel-air mass reaches the proximity to the discharge electrode of a spark plug.

13. A combustion method for a direct-injection internal combustion engine according to claim 12, wherein the ignition timing is so configured that ignition selectively occurs within the period of fuel injection.

* * * * *